June 23, 1931.  A. WINTON  1,811,601
INJECTION VALVE MEANS
Filed Oct. 8, 1927
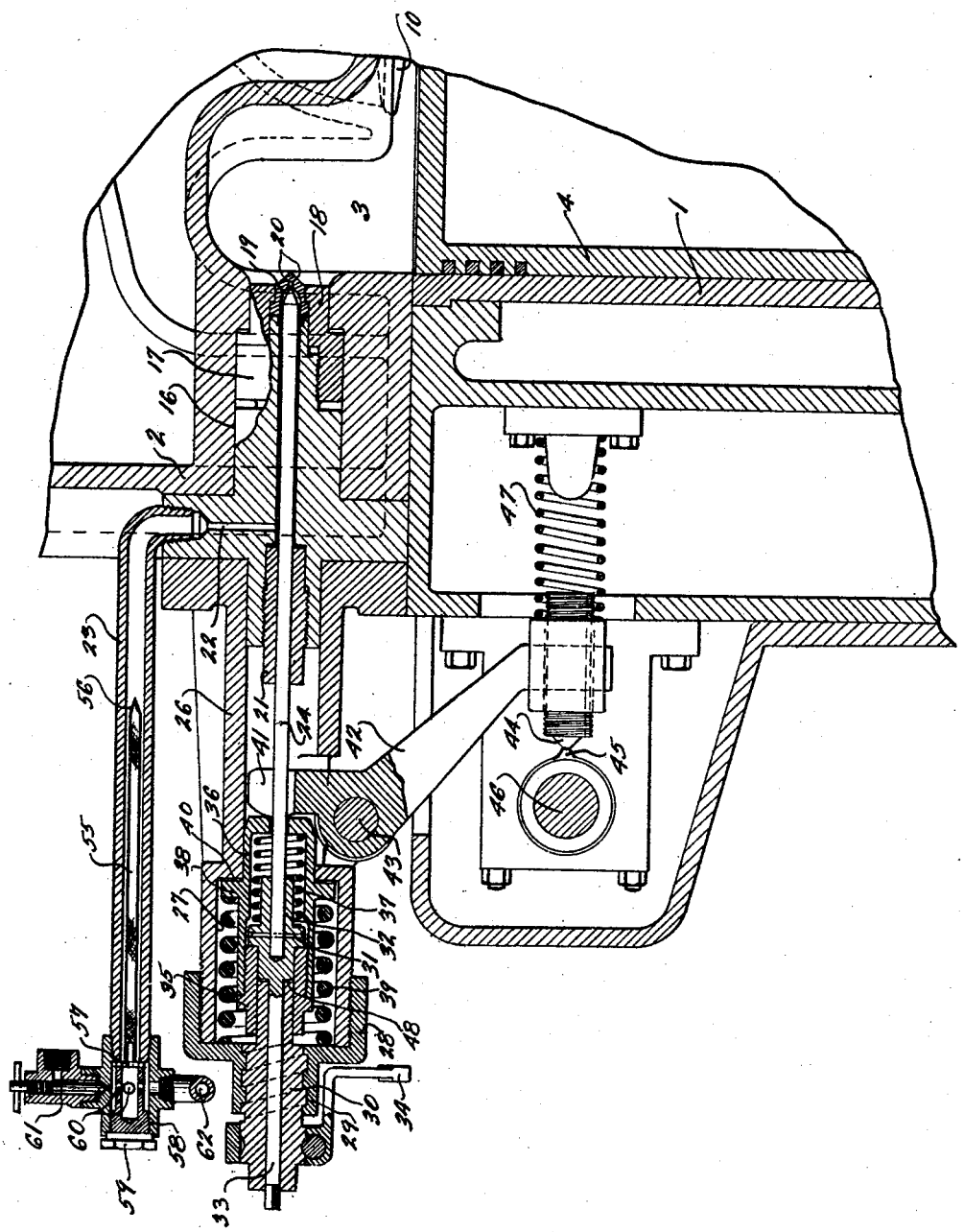
Inventor
Alexander Winton.
By Brockett + Hyde
Attorneys Patented June 23, 1931

1,811,601

UNITED STATES PATENT OFFICE

ALEXANDER WINTON, OF LAKEWOOD, OHIO

INJECTION VALVE MEANS

Application filed October 8, 1927. Serial No. 224,917.

This invention relates to injection valve means for internal combustion engines, of the solid fuel injection type.

An object of the invention is to provide an improved injection valve for controlling the fuel fed to the combustion chambers.

Another object of the invention is to provide novel means for actuating the injection valves and for controlling the same for regulation of the power output of the engine.

Further objects and advantages will be apparent from the following description taken in connection with the accompanying drawing which is a sectional detail of an injection valve and adjacent parts of the engine.

The principal parts of the engine are generally of standard construction and arrangement, each cylinder being shown as a liner 1 closed at the top by a cylinder head 2 having a cavity 3 forming a combustion chamber. In each cylinder moves a piston 4. Each piston 4 forms with its cylinder head portion and that portion of the cylinder walls above it, an expansion chamber by which energy developed by combustion is transferred into work in the usual manner.

In the cylinder head overhead of each piston is a pair of poppet valves 10 in well known arrangement.

In the cylinder head extending laterally of the combustion chamber 3 is an opening 16 into which is fitted an injection valve assembly. Seated in the opening 16 is a chambered sleeve 17 being stepped down toward the combustion chamber to make connection with a cap sleeve 18 having a face exposed in the combustion chamber. Extending through an opening in the cap sleeve 18 is a nozzle 19 having a flange secured between a shoulder on the cap sleeve 18 and the end of the chambered sleeve 17. The nozzle 19 has a tapered face projecting slightly beyond the face of the cap sleeve 18 into the combustion chamber, and is finished inside conically to form a seat for a needle type of valve. The apex of the seat is continued somewhat toward the combustion chamber in a dead ended bore of small diameter. Between the tapered face of the nozzle member and this bore are drilled a number of very fine holes 20 extending generally outwards of the small bore of the nozzle and each terminating in an orifice in the face of the nozzle. At the opposite end of the chambered sleeve 17 is a gland 21 having a long bore aligned with that of the nozzle 19. The chamber of the sleeve 17 extends between the bore of the gland 21 and that of the nozzle 19, and is of somewhat larger diameter than the bore of the gland. Communicating with this chamber is a lateral passage 22 enlarged and tapped at its outer extremity to receive the threaded end of a fuel lead 23. Extending through the gland, chambered sleeve, and to the nozzle is a valve 24. The valve is a very close sliding fit in the gland and terminates in a conical face exactly fitting the conical seat of the nozzle.

Fitting over the outer portion of the sleeve 17 and secured with the cylinder head 2 as by means of bolts 25, and thus securing the sleeve 17, is a bracket 26. The bracket is generally hollow or tubular and terminates outwardly of the cylinder head in an enlarged cylindrical cavity 27 closed by a cap 28. The cap 28 terminates in a portion having internal square threads 29 of steep pitch, into which is threaded a screw 30. The stem portion of the valve 24 is secured as by a pin 31 with a shouldered head 32 having an extension 33 projecting through a bore in the screw 30 and squared off at its extremity. Upon the outer end of the screw 30 is secured an adjusting arm 34, and the inner end of the screw is of a diameter corresponding with the diameter of the adjacent end of the valve head 32. Overlying the adjacent portions of the screw 30 and the valve head 32 is a sleeve 35 in threaded relation with a cage 36. A compression spring 37 surrounds the stem of the valve 24 in the cage 36 and bears between the shoulder of the head 32 and a shoulder formed by the head of the cage 36. The cage 36 is provided with a flange 38 against which bears an end of the compression spring 39 the opposite end of which bears against the cap 28. The forward portion of the cage 36 bears in the bracket 26 and contains a compression spring 37 bearing against the shoulder of the valve head 32.

The spring 39 is of relatively greater strength than the spring 37 whereby the combined tendency of the springs is to maintain the parts in the relation shown in Fig. 3,—that is, the spring 39 will maintain the valve closed, clearance 40 being provided between the flange 38 and the bracket 26, and the spring 37 will tend to maintain the shoulder on the valve head 32 against the sleeve 35.

The bracket 26 is slotted to receive the yoke portion 41 of an actuating lever 42 pivotally mounted on a pin 43 supported in the bracket, the yoke portion of the lever being adapted to bear against the head of the cage 36 to move the same in valve opening direction. The opposite end of the lever 42 carries a cam follower 44 arranged for actuation by a cam 45 upon a shaft 46 extending along a side of the engine and arranged to be driven at half crank shaft speed. The follower is maintained against the cam by a spring 47.

The arrangement just described will be seen to be such that upon actuation of the cam follower 44 by the cam 45 the lever 42 will move the cage 36 in valve opening direction against spring 39. Such movement of the cage will be accompanied by similar movement of the sleeve 35 allowing the valve head to recede carrying with it the valve under the action of the spring 37. Such opening movement of the valve however, will be limited by the adjusted position of the screw 30, so that the stroke of the valve will depend upon the clearance 48 between the screw 30 and the head 32, the stroke of the cage 36 however, being uniform under all conditions of operation.

Thus the valve is provided with a stem portion such as the head 32 having a portion with abutting relation with intermediate means such as the sleeve 35 and associated cage 36 against which intermediate means the spring 29 acts to urge the valve to seated relation. I have also provided gear for periodically moving this intermediate means against the spring, such gear including the lever 42, and in addition I have provided resilient means such as the spring 27, effective between the valve and the intermediate means to cause the valve to follow movements of the intermediate means effected by said gear, such following movements of the valve, however, being adjustably limited by the setting of the screw 30 which acts as a stop member.

The adjusting arm 34 of each of the injection valves may have connection with a common link 49 which has connection for actuation by a governor.

Within each fuel lead 23 extends a tubular filter screen 55 of very fine mesh wire gauge rolled upon itself, the inner end of the screen being closed as at 56, the outer end terminating in a screen head 57. The outer end of the lead is in threaded relation with a fitting 58 carrying a plug 59 having a cylindrical extension clearing the inner walls of the fitting and bearing against the screen head 57 and having a number of lateral openings 60. Each fitting 58 is provided with a bleed valve 61, preferably of the needle type indicated, whereby air may be released from that portion of the system.

Each fitting 58 makes connection with a common fuel supply line 62.

What I claim is:

1. Valve means for the purpose described comprising a valve having a stem portion, a movable intermediate member and spring means, said stem portion and said intermediate member having abutting portions and said spring means being associated with said intermediate member to act through said abutting portions to urge said valve to seated relation, gear for periodically moving said intermediate member against said spring means, resilient means effective between said valve and said intermediate member to cause said valve to follow movements of said intermediate member effected by said gear, and means for adjustably limiting said following movements of said valve.

2. Valve means for the purpose described comprising a valve having a stem portion, a movable intermediate member and spring means, said stem portion and said intermediate member having abutting portions and said spring means being associated with said intermediate member to act through said abutting portions to urge said valve to seated relation, gear for periodically moving said intermediate member against said spring means, compression spring means effective between said valve and said intermediate member to cause said valve to follow movements of said intermediate member effected by said gear, and means for adjustably limiting said following movements of said valve.

In testimony whereof I hereby affix my signature.

ALEXANDER WINTON.